United States Patent
Yang et al.

(10) Patent No.: US 11,012,902 B2
(45) Date of Patent: May 18, 2021

(54) RESOURCE CONFIGURATION METHOD FOR SWITCHING, NETWORK ACCESS POINT AND MOBILE STATION

(71) Applicant: GUANGDONG OPPO MOBILE TELECOMMUNICATIONS CORP., LTD., Guangdong (CN)

(72) Inventors: Ning Yang, Dongguan (CN); Yanan Lin, Dongguan (CN); Hai Tang, Dongguan (CN); Bin Feng, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/064,887

(22) PCT Filed: Dec. 27, 2016

(86) PCT No.: PCT/CN2016/112422
§ 371 (c)(1),
(2) Date: Jun. 21, 2018

(87) PCT Pub. No.: WO2017/133355
PCT Pub. Date: Aug. 10, 2017

(65) Prior Publication Data
US 2019/0014513 A1    Jan. 10, 2019

(30) Foreign Application Priority Data

Feb. 5, 2016 (WO) ................ PCT/CN2016/073675

(51) Int. Cl.
*H04W 36/00* (2009.01)
*H04W 36/08* (2009.01)
(Continued)

(52) U.S. Cl.
CPC ... *H04W 36/0072* (2013.01); *H04W 36/0007* (2018.08); *H04W 36/0016* (2013.01);
(Continued)

(58) Field of Classification Search
None
See application file for complete search history.

(56) References Cited

U.S. PATENT DOCUMENTS

| | | | |
|---|---|---|---|
| 2004/0058678 A1 | 3/2004 | Detorbal | |
| 2007/0184838 A1 | 8/2007 | Van Der Velde | |

(Continued)

FOREIGN PATENT DOCUMENTS

| | | | |
|---|---|---|---|
| CN | 1859784 A | 11/2006 | |
| CN | 101179839 A | 5/2008 | |

(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network ( E-UTRAN); Overall description; Stage 2 (Release 13)", 3GPP Standard; 3GPP TS 36.300, 3rd Generation Partnership Project (3GPP), Mobile Competence Centre ; 650, Route Des Lucioles ; F-06921 Sophia-Antipolis Cedex; France, vol. RAN WG2, No. V13.2.0, Jan. 11, 2016 (Jan. 11, 2016), pp. 1-290.

(Continued)

Primary Examiner — Mohammad S Adhami
(74) Attorney, Agent, or Firm — Ladas & Parry LLP

(57) ABSTRACT

Provided are a resource configuration method for switching, a network access point and a mobile station. The method comprises: a first network access point determining switching resource configuration information with a second network access point; the first network access point sending the switching resource configuration information to a mobile (Continued)

station; and the first network access point receiving switching indication information sent by the mobile station, wherein the switching indication information is used for indicating that the mobile station is to switch. In the embodiments of the present invention, by utilizing the feature that the movement of a mobile station has a predictable directionality, and by introducing the concept of a switching resource and coordinating the switching resource between network access points in advance, the switching resource can be used for switching when the mobile station needs switching, thereby reducing the switching interrupt time.

20 Claims, 4 Drawing Sheets

(51) Int. Cl.
*H04W 92/20* (2009.01)
*H04W 76/27* (2018.01)
*H04W 36/18* (2009.01)
*H04W 36/32* (2009.01)
*H04W 64/00* (2009.01)
*H04W 4/02* (2018.01)
*H04W 4/40* (2018.01)

(52) U.S. Cl.
CPC ........... *H04W 36/08* (2013.01); *H04W 36/18* (2013.01); *H04W 36/32* (2013.01); *H04W 64/006* (2013.01); *H04W 76/27* (2018.02); *H04W 92/20* (2013.01); *H04W 4/027* (2013.01); *H04W 4/40* (2018.02)

(56) References Cited

U.S. PATENT DOCUMENTS

| | | | |
|---|---|---|---|
| 2009/0088161 | A1* | 4/2009 | Narasimha .............. H04W 8/26 455/436 |
| 2010/0232393 | A1 | 9/2010 | Shuai |
| 2013/0028236 | A1 | 1/2013 | Jung |
| 2013/0294409 | A1 | 11/2013 | Shuai et al. |
| 2013/0294410 | A1 | 11/2013 | Shuai et al. |
| 2015/0181493 | A1 | 6/2015 | Park et al. |
| 2015/0215838 | A1 | 7/2015 | Li |
| 2015/0319668 | A1 | 11/2015 | Guo |
| 2016/0037402 | A1 | 2/2016 | Rosa et al. |
| 2016/0330654 | A1* | 11/2016 | Jung ..................... H04W 48/18 |
| 2017/0041841 | A1* | 2/2017 | Pedersen ........... H04W 56/0045 |
| 2017/0215117 | A1* | 7/2017 | Kwon ..................... H04B 7/04 |
| 2017/0367059 | A1 | 12/2017 | Park et al. |

FOREIGN PATENT DOCUMENTS

| | | |
|---|---|---|
| CN | 101212791 A | 7/2008 |
| CN | 101273556 A | 9/2008 |
| CN | 101316436 A | 12/2008 |
| CN | 101431780 A | 5/2009 |
| CN | 101808087 A | 8/2010 |
| CN | 102271374 A | 12/2011 |
| CN | 102625378 A | 8/2012 |
| CN | 102857980 A | 1/2013 |
| CN | 103188745 A | 7/2013 |
| CN | 103874149 A | 6/2014 |
| CN | 104255061 A | 12/2014 |
| CN | 104521281 A | 4/2015 |
| EP | 1401229 A1 | 3/2004 |
| EP | 2728929 A1 | 5/2014 |
| EP | 2815518 A1 | 12/2014 |
| JP | 2008278037 A | 11/2008 |
| JP | 2012009945 A | 1/2012 |
| JP | 2012511278 A | 5/2012 |
| JP | 2012531128 A | 12/2012 |
| JP | 5232095 B2 | 7/2013 |
| JP | 2015130634 A | 7/2015 |
| WO | 2009113150 A1 | 9/2009 |
| WO | 2013042057 A1 | 3/2013 |
| WO | 2014040245 A1 | 3/2014 |
| WO | 2014154245 A1 | 10/2014 |
| WO | 2014161161 A1 | 10/2014 |
| WO | 2015168937 A1 | 11/2015 |
| WO | 2015196382 A1 | 12/2015 |

OTHER PUBLICATIONS

Supplementary European Search Report in the European application No. 16889161.2, dated Feb. 11, 2019.
Supplementary European Search Report in the Europe application No. 16888887.3, dated Apr. 16, 2019.
English Translation of the Written Opinion of the International Searching Authority in the international application No. PCT/CN2016/112422, dated Mar. 8, 2017.
English Translation of the Written Opinion of the International Search Authority in the international application No. PCT/CN2016/073675, dated Oct. 25, 2016.
English Translation of the Written Opinion of the International Search Authority in the international application No. PCT/CN2016/077254, dated Oct. 26, 2016.
First Office Action of the Chinese application No. 201680058137.X, dated Aug. 15, 2019.
Second Office Action of the Chinese application No. 201680058137.X, dated Oct. 28, 2019.
First Office Action of Japanese application No. 2018-526894, dated Feb. 4, 2020.
First Office Action of the Israeli application No. 260116, dated Mar. 15, 2020.
First Office Action of the European application No. 16889161.2, dated Apr. 7, 2020.
Office Action of the Indian application No. 201817026628, dated Jun. 3, 2020.
First Office Action of the European application No. 16888887.3, dated Apr. 1, 2020.
Corrected Notice of Allowance of the U.S. Appl. No. 15/775,303, dated Mar. 26, 2020.
First Office Action of the Chinese appiication No. 201680058176.X, dated May 25, 2020.
Notice of Rejection of the Chinese application No. 201680058137.X, dated Mar. 19, 2020.
Office Action of the Taiwanese application No. 106103398, dated May 22, 2020.
Office Action of the Indian application No. 201817019700, dated Jul. 10, 2020.
Office Action of the Taiwanese application No. 106103397, dated Aug. 24, 2020.
Second Written Opinion of the Singaporean application No. 11201808748U, dated Sep. 10, 2020.
Second Office Action of the Canadian application No. 3019615, dated Aug. 17, 2020.
LG Electronics Inc., "Email discussion—[91bis#36][LTE/V2X] Latency analysis", 3GPP TSG-RAN WG2 #92 draft R2-156505 Anaheim, CA, USA, Nov. 16-20, 2015.
First Office Action of the Japanese application No. 2018-527933, dated Sep. 29, 2020.
Notice of Rejection of the Japanese application No. 2018-526894, dated Oct. 2, 2020.
Non-Final Office Action of the U.S. Appl. No. 15/775,303, dated May 30, 2019.
Final Office Action of the U.S. Appl. No. 15/775,303, dated Nov. 25, 2019.
Notice of Allowance of the U.S. Appl. No. 15/775,303, dated Feb. 26, 2020.
Written Opinion of the Singaporean application No. 11201808748U, dated Jan. 7, 2020.
First Office Action of the Canadian application No. 3019615, dated Aug. 30, 2019.

(56) References Cited

OTHER PUBLICATIONS

Ericsson; "Overview of V2X Enhancements for Further RAN2 Work"; 3GPP TSG-RAN WG2 #93 Tdoc R2-161571 St. Julians, Malta, Feb. 15-19, 2016.
International Search Report in international application No. PCT/CN2016/112422, dated Mar. 8, 2017.
Written Opinion of the International Search Authority in international application No. PCT/CN2016/112422, dated Mar. 8, 2017.
International Search Report in international application No. PCT/CN2016/073675, dated Oct. 25, 2016.
Written Opinion of the International Search Authority in international application No. PCT/CN2016/073675, dated Oct. 25, 2016.
International Search Report in international application No. PCT/CN2016/077254, dated Oct. 26, 2016.
Written Opinion of the International Search Authority in international application No. PCT/CN2016/077254, dated Oct. 26, 2016.
Office Action of the Taiwanese application No. 106103226, dated Aug. 13, 2020.
Second Office Action of the Chinese application No. 201680058176.X, dated Nov. 26, 2020.
Second Office Action of the European application No. 16888887.3, dated Nov. 23, 2020.

* cited by examiner

RESOURCE CONFIGURATION METHOD FOR SWITCHING, NETWORK ACCESS POINT AND MOBILE STATION

RELATED APPLICATION

This application is an application under 35 U.S.C. 371 of International Application No. PCT/CN2016/112422 filed on Dec. 27, 2016, the entire contents of which are incorporated herein by reference.

CROSS-REFERENCE TO RELATED APPLICATIONS

The present application claims priority to PCT Patent Application No. PCT/CN2016/073675, entitled "Resource Configuration Method for Handover, Network Access Point and Mobile station," filed before the Patent Office of the People's Republic of China on Feb. 5, 2016, the contents of which are hereby incorporated by reference in its entirety.

TECHNICAL FIELD

Embodiments of the disclosure relate to the field of communications, and more particularly, to a resource configuration method for handover, a network access point (AP) and a mobile station.

BACKGROUND

An application field of a network system in the future will be extended to Vehicle to X (V2X) communication, including Vehicle to Vehicle (V2V) communication, Vehicle to Infrastructure (V2I) communication, Vehicle to Pedestrian (V2P) communication, Pedestrian to Vehicle (P2V) communication and the like.

V2X communication may effectively improve traffic efficiency, avoid traffic accidents and reduce operation risks. Researches show that V2V communication may solve about 82% of collisions without casualties and about 40% of collisions occurring at crossroads in the United States.

In a V2X communication process, a vehicle is required to keep connection with a network all the time to effectively receive information of a network side, ensure resource allocation reliability and improve data transmission efficiency. However, in some scenarios, for example, there is no network coverage, vehicles usually communicate according to preconfigured resources, so that it is impossible to ensure ordered information interaction of a large number of connected vehicles, and resource utilization efficiency of a wireless network is reduced to a great extent. Therefore, V2X communication in the future will exist on the basis of vehicle-to-network communication in a biggest range, and it is necessary to ensure smooth connections between vehicles and networks to ensure ordered scheduling and resource allocation of the networks for the vehicles.

In such a process, a vehicle keeps moving and may be faster in some scenarios, so that how to ensure smooth and successful handover of the vehicle between different network APs becomes a key problem urgent to be solved.

A mechanism capable of ensuring handover exists in a conventional cellular network. However, there exists a longer transmission interruption delay in an existing handover flow, and a transient channel change problem for a mobile station which moves fast and the like may not be effectively solved.

SUMMARY

The embodiments of the disclosure provide a resource configuration method for handover, which may ensure normal communication of a mobile station in a handover process.

In a first aspect, there is provided a resource configuration method for handover, which may include that: a first network AP determines handover resource configuration information with a second network AP; the first network AP sends the handover resource configuration information to a mobile station; and the first network AP receives handover indication information from the mobile station, the handover indication information indicating that the mobile station will be handed over.

The mobile station in the embodiments of the disclosure may be terminal equipment in V2X, then the characteristic of predictable directionality of movement of the V2X mobile station may be utilized, a concept of handover resource is introduced, a handover resource is coordinated between the network APs in advance, and when the V2X mobile station requires handover, the handover resource may be used for handover. In such a manner, a target cell (i.e., the second network AP) may be configured before handover of the V2X mobile station, thereby reducing a handover interruption time.

In a possible implementation of the first aspect, after the operation that the first network AP receives the handover indication information from the mobile station, the method may further include that: the first network AP sends first indication information to the mobile station, the first indication information indicating the mobile station to communicate with the first network AP and/or the second network AP by using a configuration indicated by the handover resource configuration information.

In a possible implementation of the first aspect, the method may further include that: the first network AP receives identification information of the second network AP from the mobile station; and the first network AP determines that the mobile station will be handed over to the second network AP according to the handover indication information and the identification information.

In the solution, the mobile station may determine a target network AP according to a practical condition and notify the target network AP (i.e., the second network AP) of the mobile station to the first network AP through the identification information and the handover indication information, and the terminal equipment may be handed over anytime when being required. This solution is high in flexibility and may further reduce a terminal handover time.

In a possible implementation of the first aspect, the operation that the first network AP sends the first indication information to the mobile station may include that: when it is determined that the mobile station will be handed over from the first network AP to the second network AP, the first indication information is sent to the mobile station.

In the solution, the mobile station may notify its own requirement to the first network AP through the handover indication information to enable the first network AP to send the first indication information to the mobile station, and the mobile station may communicate according to the first indication information. This solution is high in flexibility, high in compatibility and favorable such that the first network AP determines a proper target network AP for the mobile station.

In a possible implementation of the first aspect, before the operation that the first indication information is sent to the mobile station, the method may further include that: it is determined that the mobile station will be handed over from the first network AP to the second network AP according to a moving trajectory of the mobile station; it is determined that the mobile station will be handed over from the first network AP to the second network AP according to strength of a measurement signal reported by the mobile station; and it is determined that the mobile station will be handed over from the first network AP to the second network AP according to the moving trajectory and moving speed of the mobile station.

In a possible implementation of the first aspect, the first indication information may be indicated by one or more reserved information bits of physical-layer control signaling; or the first indication information may be indicated by a new allocated Radio Network Temporary Identity (RNTI); or the first indication information may be indicated by a new physical-layer control signaling format.

In a possible implementation of the first aspect, the handover indication information may be indicated by one or more reserved information bits of the physical-layer control signaling; or the handover indication information may be indicated by Media Access Control (MAC)-layer signaling; or the handover indication information may be indicated by Radio Resource Control (RRC) signaling.

In a possible implementation of the first aspect, the operation that the first network AP determines the handover resource configuration information with the second network AP may include that: the first network AP performs coordination with the second network AP through a communication interface between the first network AP and the second network AP to determine the handover resource configuration information.

In a possible implementation of the first aspect, the handover resource configuration information may include at least one of: location information of a physical time-frequency resource block, modulation and coding scheme information, configuration information of a reference signal or antenna configuration information.

In a possible implementation of the first aspect, the operation that the first network AP sends the handover resource configuration information to the mobile station may include that: when the mobile station accesses to the first network AP, the handover resource configuration information is sent to the mobile station; or after the mobile station accesses to the first network AP, the handover resource configuration information is sent to the mobile station; or when it is determined that the mobile station will be handed over from the first network AP to the second network AP, the handover resource configuration information is sent to the mobile station.

In a possible implementation of the first aspect, the operation that the handover resource configuration information is sent to the mobile station may include that: the handover resource configuration information is sent to the mobile station through a system information broadcast; or the handover resource configuration information is sent to the mobile station through control signaling.

In a possible implementation of the first aspect, the method may further include that: uplink data sent by the mobile station via the handover resource is received.

In a possible implementation of the first aspect, the operation that the uplink data sent by the mobile station via the handover resource is received may include that: the first network AP performs coordination with at least one other network AP to receive the uplink data sent by the mobile station via the handover resource.

In a possible implementation of the first aspect, the first network AP and the at least one other network AP may use completely the same or completely different physical resource configuration information to receive the uplink data sent by the mobile station via the handover resource.

In a possible implementation of the first aspect, the at least one other network AP may include the second network AP.

In a possible implementation of the first aspect, the operation that the uplink data sent by the mobile station via the handover resource is received may include that: a plurality of uplink data packets which are the same are received from the mobile station, one uplink data packet is determined to be an uplink received data packet, and uplink data in the uplink received data packet is acquired.

In a possible implementation of the first aspect, the method may further include that: the first network AP sends downlink data to the mobile station.

In a possible implementation of the first aspect, the operation that the downlink data is sent to the mobile station may include that: the first network AP performs coordination with at least one other network AP to send the downlink data to the mobile station.

In a possible implementation of the first aspect, the first network AP and the at least one other network AP may use completely the same or completely different physical resource configuration information to send the downlink data to the mobile station.

In a possible implementation of the first aspect, the at least one other network AP may include the second network AP.

In a possible implementation of the first aspect, the operation that the downlink data is sent to the mobile station may include that: a plurality of downlink data packets which are the same are sent to the mobile station to enable the mobile station to determine one of the plurality of downlink data packets as a downlink received data packet and acquire downlink data in the downlink received data packet.

In a possible implementation of the first aspect, the first network AP may be synchronized with the second network AP, or there may be a first fixed timing offset value between the first network AP and the second network AP.

In a possible implementation of the first aspect, the first network AP may be synchronized with the mobile station, or there may be a second fixed timing offset value between the first network AP and the mobile station.

In a possible implementation of the first aspect, the method may further include that: the first network AP sends second indication information to the mobile station, wherein the second indication information may include at least one of: synchronization information between the first network AP and the second network AP, speed information of the mobile station or moving trajectory information of the mobile station.

In a second aspect, there is provided a resource configuration method for handover, which may include that: a mobile station acquires handover resource configuration information sent by a first network AP; the mobile station sends handover indication information to the first network AP, the handover indication information indicating that the mobile station will be handed over; and the mobile station communicates with the first network AP and/or a second network AP by using a configuration indicated by the handover resource configuration information.

In a possible implementation of the second aspect, the method may further include that: the mobile station receives first indication information, which is sent by the first network AP according to the handover indication information, the first indication information indicating the mobile station to use the configuration indicated by the handover resource configuration information; and the operation that the mobile station communicates with the first network AP and/or the second network AP by using the configuration indicated by the handover resource configuration information may include that: the mobile station communicates with the first network AP and/or the second network AP by using the configuration indicated by the handover resource configuration information according to the first indication information.

In a possible implementation of the second aspect, the method may further include that: the mobile station sends identification information of the second network AP to the first network AP such that the first network AP determines that the mobile station will be handed over to the second network AP according to the identification information and the handover indication information.

In a possible implementation of the second aspect, the operation that the mobile station sends the handover indication information to the first network AP may include that: if the mobile station determines that the mobile station will be handed over, the handover indication information is sent to the mobile station.

In a possible implementation of the second aspect, the method may further include that: the mobile station determines whether the mobile station will be handed over according to a moving trajectory of the mobile station; or the mobile station determines whether the mobile station will be handed over according to strength of a signal received from the first network AP; or the mobile station determines whether the mobile station will be handed over according to the moving trajectory and moving speed of the mobile station.

In a possible implementation of the second aspect, the first indication information may be indicated by one or more reserved information bits of physical-layer control signaling; or the first indication information may be indicated by a new allocated RNTI; or the first indication information may be indicated by a new physical-layer control signaling format.

In a possible implementation of the second aspect, the handover indication information may be indicated by one or more reserved information bits of the physical-layer control signaling; or the handover indication information may be indicated by MAC-layer signaling; or the handover indication information may be indicated by RRC signaling.

In a possible implementation of the second aspect, the operation that the mobile station acquires the handover resource configuration information sent by the first network AP may include that: when the mobile station accesses to the first network AP, the handover resource configuration information sent by the first network AP is received; or after the mobile station accesses to the first network AP, the handover resource configuration information sent by the first network AP is received; or when the mobile station will be handed over from the first network AP to the second network AP, the handover resource configuration information sent by the first network AP is received.

In a possible implementation of the second aspect, the handover resource configuration information may be sent by the first network AP through a system information broadcast; or the handover resource configuration information may be sent by the first network AP through control signaling.

In a possible implementation of the second aspect, the operation that the mobile station communicates with the first network AP and/or the second network AP may include that: the mobile station sends uplink data via the handover resource to enable the first network AP and/or the second network AP to receive the uplink data.

In a possible implementation of the second aspect, the operation that the mobile station sends the uplink data via the handover resource may include that: the mobile station adopts a preset Cyclic Prefix (CP) value to send the uplink data via the handover resource to enable the uplink data to reach the first network AP and the second network AP at the same time, wherein the preset CP value may be larger than a fixed threshold value.

In a possible implementation of the second aspect, the operation that the mobile station communicates with the first network AP and/or the second network AP may include that: the mobile station receives downlink data sent by the first network AP and/or the second network AP via the handover resource.

In a possible implementation of the second aspect, the operation that the mobile station receives the downlink data sent by the first network AP and/or the second network AP via the handover resource may include that: the mobile station receives a plurality of downlink data packets which are the same from the first network AP and/or the second network AP; one of the plurality of downlink data packets which are the same is determined to be a downlink received data packet; and downlink data in the downlink received data packet is acquired.

In a possible implementation of the second aspect, the mobile station may be synchronized with the first network AP, or there may be a second fixed timing offset value between the mobile station and the first network AP.

In a possible implementation of the second aspect, the handover resource configuration information may include at least one of: location information of a physical time-frequency resource block, modulation and coding scheme information, configuration information of a reference signal or antenna configuration information.

In a possible implementation of the second aspect, the method may further include that: the mobile station receives second indication information sent by the first network AP, the second indication information including at least one of: synchronization information between the first network AP and the second network AP, speed information of the mobile station or moving trajectory information of the mobile station; and the mobile station acquires uplink synchronization information of the second network AP according to the second indication information.

In a third aspect, there is provided a network AP, which is a first network AP and includes a determination unit configured to determine handover resource configuration information with a second network AP; a sending unit configured to send the handover resource configuration information determined by the determination unit to a mobile station; and a receiving unit configured to receive handover indication information from the mobile station, the handover indication information indicating that the mobile station will be handed over. The network AP may be configured to execute each process executed by the first network AP in the first aspect or any implementation of the first aspect.

In a fourth aspect, there is provided a network AP, which includes a sender, a receiver, a processor and a memory. The network AP may be configured to execute each process executed by the first network AP in the method of the first aspect and the implementations thereof.

In a fifth aspect, there is provided a computer-readable storage medium, the computer-readable storage medium stores a program, and the program enables a network AP to execute any resource configuration method for handover in the first aspect and various implementations thereof.

In a sixth aspect, there is provided a mobile station, which includes an acquisition unit configured to acquire handover resource configuration information sent by a first network AP; a sending unit configured to send handover indication information to the first network AP, the handover indication information indicating that the mobile station will be handed over; and a communication unit configured to communicate with the first network AP and/or a second network AP by using a configuration indicated by the handover resource configuration information. The mobile station may be configured to execute each process executed by the mobile station in the second aspect or any implementation of the second aspect.

In a seventh aspect, there is provided a mobile station, which includes a sender, a receiver, a processor and a memory. The mobile station may be configured to execute each process executed by the mobile station in the second aspect or any implementation of the second aspect.

In an eighth aspect, there is provided a computer-readable storage medium, the computer-readable storage medium stores a program, and the program enables a mobile station to execute any resource configuration method for handover in the second aspect and various implementations thereof.

Optionally, the handover resource configuration information may include at least one of: the location information of the physical time-frequency resource block, the modulation and coding scheme information, the configuration information of the reference signal and the antenna configuration information.

Optionally, the first indication information may be indicated by the reserved information bit of the physical-layer control signaling; or the first indication information may be indicated by the new allocated RNTI; or the first indication information may be indicated by the new physical-layer control signaling format.

Optionally, the control signaling or the physical-layer control signaling may be a Physical Downlink Control Channel (PDCCH).

Optionally, the first network AP may be synchronized with the second network AP, or there may be the first fixed timing offset value between the first network AP and the second network AP.

Optionally, the first network AP may be synchronized with the mobile station, or there may be the second fixed timing offset value between the first network AP and the mobile station.

DETAILED DESCRIPTION

Figure 1:
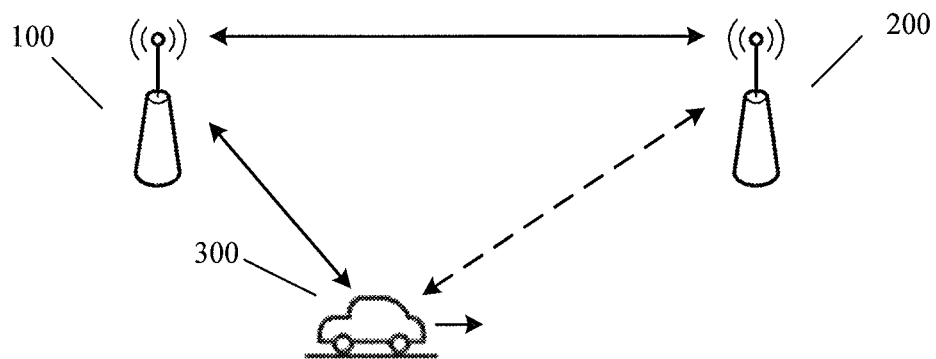
FIG. 1 is a schematic diagram illustrating a handover process of a mobile station according to an embodiment of the disclosure.

The technical solutions in the embodiments of the disclosure will be clearly and completely described below in conjunction the drawings in the embodiments of the disclosure. It is apparent that the described embodiments are not all embodiments but part of embodiments of the disclosure. All other embodiments obtained by those skilled in the art on the basis of the embodiments in the disclosure without creative work shall fall within the scope of protection of the disclosure.

Various embodiments of the disclosure are described in conjunction with a mobile station. The mobile station may also be called as User Equipment (UE), terminal equipment, an access terminal, a user unit, a user station, a mobile radio station, a remote station, a remote terminal, mobile equipment, a user terminal, a terminal, wireless communication equipment, a user agent, a user device or the like. The mobile station may be a station in a Wireless Local Area Network (WLAN), and may be a cell phone, a cordless phone, a Session Initiation Protocol (SIP) phone, a Wireless Local Loop (WLL) station, a Personal Digital Assistant (PDA), handheld equipment with a wireless communication function, computing equipment, other processing equipment connected to a wireless modem, vehicle-mounted equipment, wearable equipment, a mobile station in a future 5th-Generation (5G) network, a mobile station in a future evolved Public Land Mobile Network (PLMN) or the like. For example, the mobile station in the embodiments of the disclosure may be an On Board Unit (OBU) mounted on a vehicle.

In addition, various embodiments of the disclosure are described in combination with network equipment. The network equipment may be equipment configured to communicate with the mobile station, and the network equipment may be an AP in the WLAN, a Base Transceiver Station (BTS) in a Global System for Mobile Communication (GSM) or Code Division Multiple Access (CDMA), may also be aNodeB (NB) in Wideband Code Division Multiple Access (WCDMA), and may further be an Evolutional Node B (eNB or eNodeB) in Long Term Evolution (LTE), or a relay station or AP, or vehicle-mounted equipment, wearable equipment, network equipment in the future 5G network, network equipment in the future evolved PLMN or the like.

In addition, various aspects or characteristics of the embodiments of the disclosure may be implemented into a method, a device or a product programmed with a standard and/or using an engineering technology. Term "product" used in the application covers a computer program which may be accessed from any computer-readable device, carrier or medium. For example, the computer-readable medium may include, but not limited to: a magnetic storage device (for example, a hard disk, a floppy disk or a magnetic tape), an optical disk (for example, a Compact Disk (CD) and a Digital Versatile Disk (DVD)), a smart card and a flash memory (for example, an Erasable Programmable Read- Only Memory (EPROM), a card, a stick or a key driver). In addition, various storage media described in the disclosure may represent one or more pieces of equipment and/or other machine-readable media configured to store information. Term "machine-readable medium" may include, but not limited to, a wireless channel and various other media capable of storing, including and/or bearing instructions and/or data.

FIG. 1 is a schematic diagram illustrating a handover process of a mobile station according to an embodiment of the disclosure. As shown in FIG. 1, a first network AP 100, a second network AP 200 and a mobile station 300 are included.

Here, the first network AP 100 and the second network AP 200 may communicate through a cellular link, and for example, communicate through a communication interface between the first network AP 100 and the second network AP 200. Here, the communication interface may be an X2 interface.

The mobile station 300 may be in a fast moving state. For example, the mobile station 300 is initially located within coverage of a network of the first network AP 100, and may directly communicate with the first network AP 100. Subsequently, the mobile station 300 moves fast and gradually enters coverage of a network of the second network AP 200. In this process, the mobile station 300 requires handover of a corresponding transmission resource, which may cause a longer transmission delay.

According to the embodiment of the disclosure, the characteristic of predictability of movement of the mobile station is utilized, and a handover resource is coordinated between the network APs in advance to facilitate use of the mobile station over the handover resource in a handover process, so that a handover interruption time may be reduced.

It is to be understood that conditions, manners and the like in the embodiment of the disclosure are divided only for convenient description and should not form specific limits and characteristics in each condition and manner may be combined without conflicts.

Figure 2:
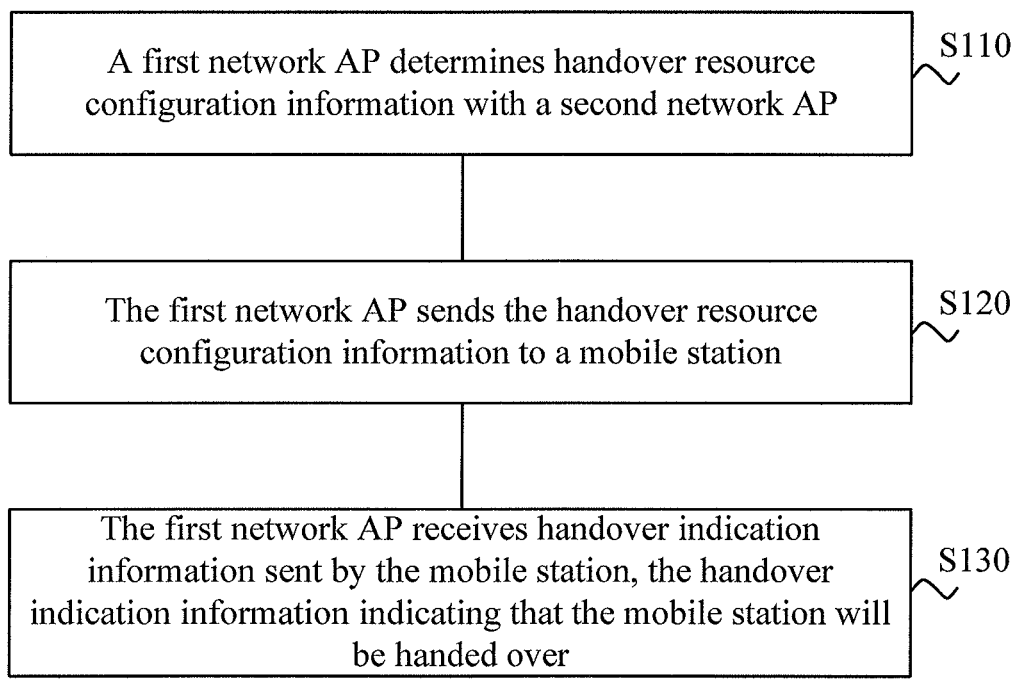
FIG. 2 is a schematic flowchart illustrating an example of a resource configuration method for handover according to an embodiment of the disclosure.

FIG. 2 is a schematic flowchart illustrating an example of a resource configuration method for handover according to an embodiment of the disclosure. The method shown in FIG. 2 is executed by a first network AP, and includes the following operations.

In S110, the first network AP determines handover resource configuration information with a second network AP.

Here, the handover resource configuration information may include at least one of: location information of a physical time-frequency resource block, modulation and coding scheme information, configuration information of a reference signal or antenna configuration information.

The handover resource configuration information may further include time-frequency resource configuration information, a transmission bandwidth and the like, which will not be listed one by one herein.

Optionally, the handover resource configuration information includes configuration information of a handover resource used for handover of a serving network AP from the first network AP to the second network AP; and/or the handover resource configuration information includes configuration information of a handover resource used for handover of the serving network AP from the first network AP to the first network AP and the second network AP; and/or the handover resource configuration information includes configuration information of a handover resource of the first network AP.

It can be understood that at least one other network AP may be deployed around the first network AP, and the first network AP may directly communicate with the at least one other network AP through a communication interface (for example, an X2 interface).

As a first condition, if there is only one other network AP, i.e., the second network AP, around the first network AP, the first network AP is only required to determine the handover resource configuration information with the second network AP in S110.

Optionally, the first network AP may perform coordination with the second network AP through the communication interface to determine the handover resource configuration information.

Here, the first network AP is synchronized with the second network AP, or there is a first fixed timing offset value between the first network AP and the second network AP.

The first network AP may perform resource coordination with the second network AP to determine a handover resource pool in a negotiation manner. For example, a first handover resource pool and a second handover resource pool may be determined, wherein the first handover resource pool may subsequently be sent to the mobile station by the first network AP to enable the mobile station to use a handover resource in the first handover resource pool in a process of handover from the first network AP to the second network AP, wherein the second handover resource pool may subsequently be sent to the mobile station by the second network AP to enable the mobile station to use a handover resource in the second handover resource pool in a process of handover from the second network AP to the first network AP.

In such a manner, the handover resource used by the mobile station handed over from the first network AP to the second network AP is different from the handover resource used by the mobile station handed over from the second network AP to the first network AP as much as possible, so that a resource conflict between different mobile stations in the handover process may be avoided, resource contention may be reduced, and data transmission efficiency of the mobile station in the handover process may be ensured better.

As a second condition, if there are multiple (namely at least two) other network APs (including the second network AP) around the first network AP, the first network AP may determine handover resource configuration information with the multiple network APs in S110, wherein the multiple network APs include the second network AP.

Optionally, the first network AP may perform coordination with the multiple network APs through communication interfaces therebetween to determine the corresponding handover resource configuration information.

As an embodiment, the first network AP may determine common handover resource configuration information with the multiple network APs. At this moment, the first network AP determines a group of handover resource configuration information.

As another embodiment, the first network AP may determine handover resource configuration information with each network AP respectively. At this moment, the first network AP determines multiple groups of handover resource configuration information corresponding to the multiple network APs one to one.

In S120, the first network AP sends the handover resource configuration information to a mobile station.

In the embodiment of the disclosure, the first network AP may send the handover resource configuration information to the mobile station through a system information broadcast. or the first network AP may send the handover resource configuration information to the mobile station through control signaling.

Here, the control signaling may be physical-layer control signaling, and for example, is a PDCCH.

Here, the first network AP is synchronized with the mobile station. or there is a second fixed timing offset value between the first network AP and the mobile station.

Optionally, as an embodiment, the handover resource configuration information may be sent to the mobile station when the mobile station accesses to the first network AP. For example, the handover resource configuration information may be sent to the mobile station in a process of random access of the mobile station to the first network AP.

Optionally, as another embodiment, the handover resource configuration information may be sent to the mobile station after the mobile station accesses to the first network AP. For example, the handover resource configuration information may be sent to the mobile station after the process of random access of the mobile station to the first network AP is completed.

Optionally, as another embodiment, the handover resource configuration information may be sent to the mobile station when it is determined that the mobile station will be handed over from the first network AP to the second network AP.

Correspondingly, it can be understood that, before S120, the first network AP may judge whether the mobile station will be handed over, and for example, judges whether the mobile station will be handed over from the first network AP to the second network AP or not.

For example, whether the mobile station will be handed over may be judged according to strength of a measurement signal reported by the mobile station. or whether the mobile station will be handed over may be judged according to a moving trajectory of the mobile station. or whether the mobile station will be handed over may be judged according to the moving trajectory and moving speed of the mobile station.

It is to be noted that, if the multiple groups of handover resource configuration information corresponding to the multiple network APs one to one are determined in S110, the handover resource configuration information sent to the mobile station by the first network AP in S120 should further include identification information of the corresponding network APs.

Optionally, the first network AP may further send second indication information to the mobile station, and the second indication information includes at least one of: synchronization information between the first network AP and the second network AP, speed information of the mobile station or moving trajectory information of the mobile station. Here, the synchronization information includes uplink synchronization information and downlink synchronization information. Therefore, the mobile station may further determine uplink synchronization information of the second network AP after acquiring the uplink synchronization information, the downlink synchronization information, the speed information, the moving trajectory information and the like.

Here, the synchronization information between the first network AP and the second network AP may include the first timing offset value. Therefore, the mobile station may acquire synchronization information of the second network AP on the basis of the first timing offset value in the synchronization information and a synchronization relationship between the mobile station and the first network AP.

In S130, the first network AP receives handover indication information sent to the first network AP by the mobile station.

Here, the handover indication information is configured to indicate that the mobile station will be handed over. Optionally, the handover indication information is indicated by one or more reserved information bits of physical-layer control signaling; or the handover indication information is indicated by MAC-layer signaling; or the handover indication information is indicated by RRC signaling.

It is to be noted that, in the embodiment of the disclosure, that the handover indication information is configured to indicate that the mobile station will be handed over may include the following conditions.

1: the mobile station will perform network AP handover.

It is to be noted that, in the embodiment of the disclosure, the first condition may at least include the following two conditions.

1a: the mobile station is required to be handed over from a present network AP to another network AP and is disconnected from the present network AP.

For example, the mobile station communicates with the first network AP at present, and the handover indication information may be configured to indicate that the mobile station will communicate with the other network AP.

1b: the mobile station is required to be handed over from the present network AP to the present network AP and the other network AP.

For example, the mobile station communicates with the first network AP at present, and the handover indication information may be configured to indicate that the mobile station will communicate with the first network AP and the other network AP.

2: the mobile station will perform network AP resource handover.

For example, if the mobile station uses a first resource of the first network AP at present, the handover indication information is configured to indicate that the mobile station will use another resource of the first network AP.

In the embodiment of the disclosure, the characteristic of predictable directionality of movement of the mobile station is utilized, a concept of handover resource configuration information is introduced, the handover resource is coordinated between the network APs in advance, and when the mobile station requires handover, the handover resource configuration information may be used for handover, so that a handover interruption time is reduced. Furthermore, the mobile station may notify the first network AP that the mobile station will be handed over through the handover indication information, such a manner is higher in flexibility, the mobile station may be handed over when being required, handover efficiency may be improved, the handover interruption time may be shortened, and meanwhile, the method may improve a user experience.

Optionally, in the embodiment of the disclosure, the first network AP may send first indication information to the mobile station after receiving the handover indication information. The first indication information may be configured to indicate the mobile station to communicate with the first network AP and/or the second network AP by using a configuration indicated by the handover resource configuration information (wherein, the handover resource configuration information may include the handover resource and a related parameter).

It is to be noted that, in the embodiment of the disclosure, the handover indication information may include handover of multiple conditions mentioned above, and correspondingly, the first indication information may be configured to respond to the handover indication information. The embodiment of the disclosure will be described below with the condition that the handover indication information indicates that the mobile station will perform network AP handover as an example in detail.

In the embodiment of the disclosure, there is made such a hypothesis that the mobile station will perform network AP handover, wherein a target network AP for handover may be determined by the mobile station and may also be determined by the first network AP.

(1) The mobile station determines that the mobile station will be handed over to the second network AP (i.e., the target network AP).

Optionally, the first network AP may also receive identification information of the second network AP from the mobile station. The first network AP may determine that the mobile station will be handed over to the second network AP according to the identification information and the handover indication information.

Here, the identification information and the handover indication information may be born in the same message and may be born in two messages, which will not be limited in the embodiment of the disclosure.

Optionally, if the first network AP also receives the identification information, the first indication information mentioned above may be Acknowledgement (ACK) feedback information.

The first network AP may execute a related operation, for example, an operation of notifying the second network AP to be prepared for access of the mobile station, after acquiring that the mobile station will be handed over to the second network AP.

(2) The first network AP determines that the mobile station will be handed over to the second network AP.

Specifically, after the first network AP receives the handover indication information, first network equipment learns about that the mobile station has a network AP handover requirement, and the first network equipment may determine the target AP.

For example, it is determined that the mobile station will be handed over from the first network AP to the second network AP according to the moving trajectory of the mobile station.

For another example, it is determined that the mobile station will be handed over from the first network AP to the second network AP according to the strength of the measurement signal reported by the mobile station.

For another example, it is determined that the mobile station will be handed over from the first network AP to the second network AP according to the moving trajectory and moving speed of the mobile station.

The first network AP may notify the target AP to the mobile station through the first indication information after determining the target network AP of the mobile station. In other words, when it is determined that the mobile station will be handed over from the first network AP to the second network AP, the first network AP may send the first indication information to the mobile station.

It is to be noted that, according to the method of the embodiment of the disclosure, the first network AP may send the handover resource configuration information to the mobile station in advance to enable the mobile station to perform handover according to the configuration indicated by the handover resource configuration information when being required to be handed over, so that the handover interruption time may be reduced. Furthermore, whether the mobile station will be handed over may be determined by the first network AP and may also be determined by the mobile station. Correspondingly, the target network AP may be determined by the first network AP and may also be determined by the mobile station. The solution is high in flexibility and favorable for handover of the mobile station.

Optionally, the first indication information may be indicated by one or more reserved information bits of the physical-layer control signaling; or the first indication information is indicated by a new allocated RNTI; or the first indication information is indicated by a new physical-layer control signaling format.

It is to be noted that, in the embodiment of the disclosure, the reserved information bit of the physical-layer control signaling may refer to a reserved field or reserved bit which is not used and specifically defined in a physical-layer control signaling format defined in an existing protocol.

It is to be noted that, in the embodiment of the disclosure, the new physical-layer control signaling format is different from the physical-layer control signaling format defined in the existing protocol, or may also be understood as a physical-layer control signaling format redefined in a future protocol.

It is to be noted that, in the embodiment of the disclosure, the new allocated RNTI is reallocated besides existing RNTIs, and the new RNTI may be specially configured to represent the first indication information.

Optionally, the mobile station may communicate with the first network AP and/or the second network AP via the handover resource indicated by the handover resource configuration information received in S120 after receiving the first indication information.

Optionally, the first indication information may be sent to the mobile station when it is determined that the mobile station will be handed over from the first network AP to the second network AP.

It is to be noted that, if the multiple groups of handover resource configuration information corresponding to the multiple network APs one to one are determined in S110, the multiple groups of handover resource configuration information and the identification information of the corresponding network APs are sent to the mobile station in S120. Then, the first indication information in S130 may include the identification information of the network APs.

For example, the first indication information may include the identification information of the second network AP. Then, after receiving the first indication information, the mobile station may determine the handover resource configuration information corresponding to the identification information according to the identification information of the second network AP in the first indication information and perform subsequent communication via the handover resource indicated by the handover resource configuration information.

Optionally, after S130, the first network AP may receive uplink data sent by the mobile station via the handover resource.

For example, if the mobile station sends a plurality of uplink data packets which are the same via the handover resource, the first network AP may receive the plurality of uplink data packets which are the same, determine one of the plurality of uplink data packets as an uplink received data packet and acquire uplink data in the uplink received data packet.

Here, the first network AP may perform coordination with at least one other network AP to receive the uplink data sent by the mobile station via the handover resource. Here, the at least one other network AP may include the second network AP. That is, the first network AP may perform coordination with the second network AP and receive the uplink data sent by the mobile station via the handover resource.

It is to be noted that, when the first network AP performs coordinated receiving with the other network AP, locations and configurations of physical resources used when each network AP receives data packets are completely the same; or the locations and configurations of the physical resources used when each network AP receives the data packets are completely staggered. Moreover, one data packet is subsequently selected from the received data packets as a received data packet.

In a coordinated receiving process, the first network AP and the at least one other network AP may use completely the same physical resource configuration information, or the first network AP and the at least one other network AP may use completely different physical resource configuration information. Here, the at least one other network AP may include the second network AP. That is, the first network AP and the second network AP may use completely the same or completely different physical resource configuration information.

Optionally, the first network AP may send downlink data to the mobile station.

For example, the first network AP may send a plurality of downlink data packets which are the same to the mobile station to enable the mobile station to determine one of the plurality of downlink data packets as a downlink received data packet and acquire downlink data in the downlink received data packet.

Specifically, in the process of handover of the mobile station from the first network AP to the second network AP, the first network AP may send the downlink data to the mobile station. Correspondingly, the mobile station may receive the downlink data via the handover resource.

Here, the first network AP may perform coordination with at least one other network AP to send the downlink data to the mobile station. Here, the at least one other network AP may include the second network AP. That is, the first network AP may perform coordination with the second network AP to send the downlink data to the mobile station.

It is to be noted that, when the first network AP performs coordinated sending with the other network AP, each network AP sends the same data packet and uses physical resources of which locations and configurations are the same.

In a coordinated sending process, the first network AP and the at least one other network AP may use completely the same physical resource configuration information, or the first network AP and the at least one other network AP may use completely different physical resource configuration information. Here, the at least one other network AP may include the second network AP. That is, the first network AP and the second network AP may use completely the same or completely different physical resource configuration information.

Figure 3:
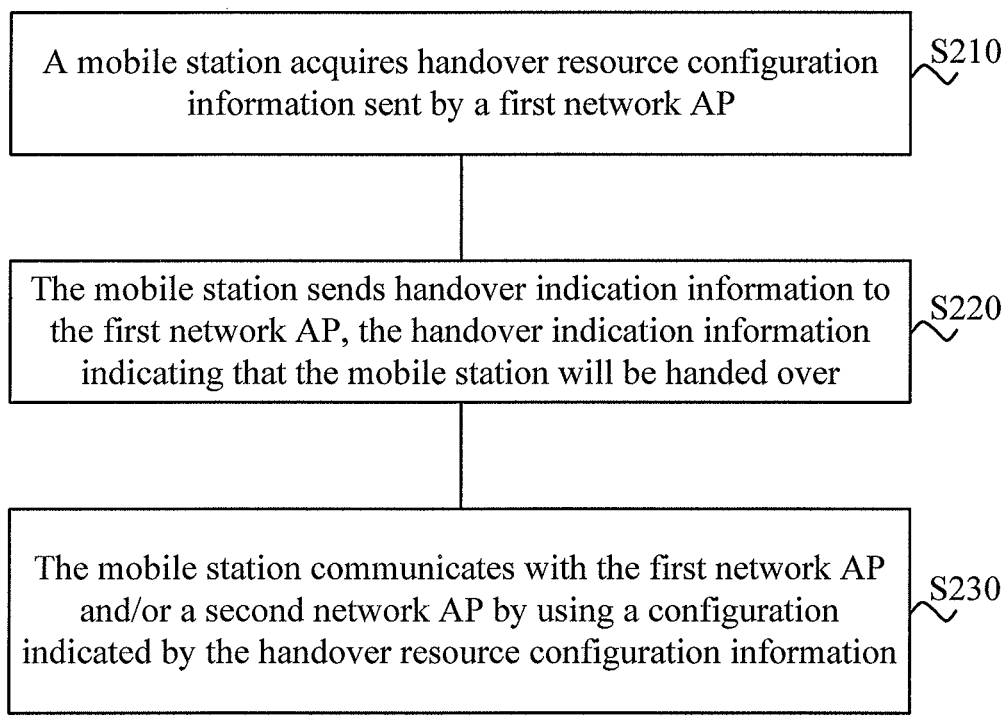
FIG. 3 is a schematic flowchart illustrating another example of a resource configuration method for handover according to another embodiment of the disclosure.

FIG. 3 is a schematic flowchart illustrating another example of a resource configuration method for handover according to another embodiment of the disclosure. The method shown in FIG. 3 is executed by a mobile station, and includes the following operations.

In S210, the mobile station acquires handover resource configuration information sent by a first network AP.

Here, the handover resource configuration information may include at least one of: location information of a physical time-frequency resource block, modulation and coding scheme information, configuration information of a reference signal or antenna configuration information.

Optionally, the handover resource configuration information may be sent by the first network AP through a system information broadcast. or the handover resource configuration information may be sent by the first network AP through control signaling, wherein the control signaling may be physical downlink signaling, and for example, may be a PDCCH.

Here, the first network AP is synchronized with the mobile station, or there is a second fixed timing offset value between the first network AP and the mobile station.

Optionally, as an embodiment, the handover resource configuration information sent by the first network AP may be received when the mobile station accesses to the first network AP.

Optionally, as another embodiment, the handover resource configuration information sent by the first network AP may be received after the mobile station accesses to the first network AP.

Optionally, as another embodiment, the handover resource configuration information sent by the first network AP may be received when the mobile station will be handed over from the first network AP to a second network AP.

S210 may refer to S120 in the embodiment of FIG. 2, and will not be elaborated herein to avoid repetitions.

In S220, the mobile station sends handover indication information to the first network AP, the handover indication information indicating that the mobile station will be handed over.

Specifically, the mobile station may send the handover indication information to the first network AP to enable the first network AP to learn about that the mobile station will be handed over, and then the first network AP may execute a related operation.

Optionally, if the mobile station determines that the mobile station will be handed over, the mobile station may send the handover indication information to the first network AP, wherein the mobile station may determine whether the mobile station will be handed over in multiple manners.

Optionally, if the mobile station receives the handover resource configuration information sent by the first network AP, the mobile station may determine that it will be handed over and send the handover indication information to the first network AP.

For example, the mobile station determines whether the mobile station will be handed over according to a moving trajectory of the mobile station.

For another example, the mobile station determines whether the mobile station will be handed over according to strength of a signal received from the first network AP.

For another example, the mobile station determines whether the mobile station will be handed over according to the moving trajectory and moving speed of the mobile station.

Furthermore, the mobile station may further determine a target network AP for handover when determining whether the mobile station will be handed over.

For example, the mobile station determines that the mobile station will be handed over from the first network AP to a second network AP according to the moving trajectory of the mobile station.

For another example, the mobile station determines that the mobile station will be handed over from the first network AP to the second network AP according to the strength of the signal of the first network AP and strength of a signal of the second network AP.

Optionally, the mobile station may further receive first indication information sent by the first network AP, and the first indication information is configured to indicate the mobile station to start communicating with the first network AP and/or the second network AP by using a configuration indicated by the handover resource configuration information.

Optionally, the first indication information may be indicated by one or more reserved information bits of physical-layer control signaling; or the first indication information is indicated by a new allocated RNTI; or the first indication information is indicated by a new physical-layer control signaling format.

Optionally, the physical-layer control signaling may be a PDCCH.

Specifically, the first indication information sent by the first network AP is received when the mobile station will be handed over from the first network AP to the second network AP.

Optionally, the first indication information may further include identification information of the network AP corresponding to the handover resource.

S220 may refer to S130 in the embodiment of FIG. 2, and will not be elaborated herein to avoid repetitions.

Optionally, the method may further include that: the mobile station receives second indication information sent by the first network AP. The second indication information includes at least one of: synchronization information between the first network AP and the second network AP, speed information of the mobile station or moving trajectory information of the mobile station. Furthermore, the mobile station acquires uplink synchronization information of the second network AP according to the second indication information.

In S230, the mobile station communicates with the first network AP and/or a second network AP by using a configuration indicated by the handover resource configuration information.

Optionally, the mobile station receives the first indication information, which is sent by the first network AP according to the handover indication information, the first indication information indicating the mobile station to communicate with the first network AP and/or the second network AP by using the configuration indicated by the handover resource configuration information; and the operation that the mobile station communicates with the first network AP and/or the second network AP by using the configuration indicated by the handover resource configuration information includes that: the mobile station communicates with the first network AP and/or the second network AP by using the configuration indicated by the handover resource configuration information according to the first indication information.

Optionally, the mobile station starts using a handover resource indicated by the handover resource configuration information received in S120 after receiving the first indication information. It can be understood that, if the first indication information includes the identification information of the network AP, the mobile station uses the handover resource indicated by the handover resource configuration information corresponding to the identification information.

Optionally, the mobile station sends identification information of the second network AP to the first network AP such that the first network AP determines that the mobile station will be handed over to the second network AP according to the identification information and the handover indication information. A specific description about the solution may refer to a related description made above and will not be elaborated herein for simplicity.

Optionally, the mobile station may send uplink data via the handover resource.

For example, the mobile station sends a plurality of uplink data packets which are the same via the handover resource to enable the first network AP and/or the second network AP to receive the plurality of uplink data packets which are the same, determine one of the plurality of uplink data packets as an uplink received data packet and acquire uplink data in the uplink received data packet.

As an example, the mobile station may adopt a preset CP value to send the uplink data via the handover resource to enable the uplink data to reach the first network AP and the second network AP at the same time, wherein the preset CP value is larger than a fixed threshold value.

Therefore, the mobile station may use a CP with a larger length to ensure that the uplink data reaches the first network AP and the second network AP at the same time.

Optionally, the mobile station may receive downlink data via the handover resource.

Here, the downlink data may be sent by the first network AP or the second network AP. or here, the downlink data may also be sent by the first network AP and the second network AP in a coordinated manner.

For example, the mobile station may receive a plurality of downlink data packets which are the same from the first network AP and/or the second network AP, determine one of the plurality of downlink data packets which are the same, as a downlink received data packet and acquire downlink data in the downlink received data packet.

S230 may refer to a related description about communication after S130 in the embodiment of FIG. 2 and will not be elaborated herein to avoid repetitions.

It is to be noted that related descriptions in the embodiment of FIG. 2 may refer to related descriptions in the embodiment of FIG. 1 and will not be elaborated herein for simplicity.

Figure 4:
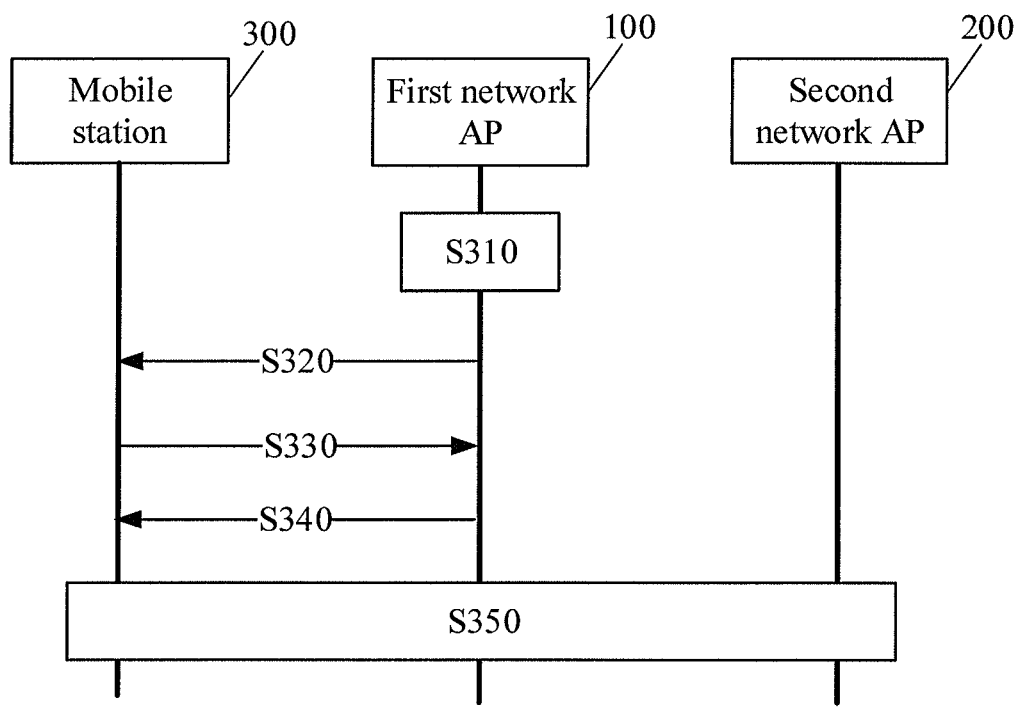
FIG. 4 is a schematic flowchart illustrating another example of a resource configuration method for handover according to another embodiment of the disclosure.

FIG. 4 is a schematic flowchart illustrating another example of a resource configuration method for handover according to an embodiment of the disclosure. A first network AP 100, a second network AP 200 and a mobile station 300 are shown in FIG. 4. The method shown in FIG. 4 includes the following operations.

In S310, the first network AP 100 determines handover resource configuration information with the second network AP 200.

Optionally, the first network AP may perform coordination with the second network AP through a communication interface to determine the handover resource configuration information.

S310 in FIG. 4 may refer to S110 in the embodiment of FIG. 2, and will not be elaborated herein to avoid repetitions.

In S320, the first network AP 100 sends the handover resource configuration information to the mobile station 300.

Optionally, the handover resource configuration information may be sent to the mobile station 300 through a system information broadcast or control signaling.

S320 in FIG. 4 may refer to S120 in the embodiment of FIG. 2 or S210 in the embodiment of FIG. 3, and will not be elaborated herein to avoid repetitions.

In S330, the first network AP 100 receives handover indication information from the mobile station 300, the handover indication information indicating that the mobile station 300 will be handed over.

S330 in FIG. 4 may refer to S130 in the embodiment of FIG. 2 or S220 in the embodiment of FIG. 3, and will not be elaborated herein to avoid repetitions.

Optionally, in S340, the first network AP 100 sends first indication information to the mobile station 300, the first indication information indicating the mobile station 300 to start using a handover resource.

Optionally, the first indication information may be sent when the mobile station 300 accesses to the first network AP 100, or after access of the mobile station 300 to the network of the first network AP 100 or when it is determined that the mobile station 300 will be handed over from the first network AP 300 to the second network AP 200.

S340 in FIG. 4 may refer to related descriptions about the first indication information in the embodiment of FIG. 2 or FIG. 3, and will not be elaborated herein to avoid repetitions.

In S350, the mobile station 300 communicates with the first network AP and/or the second network AP by using a configuration indicated by the handover resource configuration information.

Optionally, the mobile station 300 may send uplink data or receive downlink data sent by the first network AP 100 and/or the second network AP 200 via the handover resource.

S350 in FIG. 4 may refer to related descriptions in the embodiments of FIG. 2 and FIG. 3, and will not be elaborated herein to avoid repetitions.

Furthermore, it is to be understood that, due to fast movement of the mobile station 300, the mobile station 300 may execute a random access process with the second network AP 200 and communicate according to a cellular link transmission resource allocated by the second network AP 200 after the mobile station 300 moves into coverage of a network of the second network AP 200. Moreover, the second network AP 200 may also similarly determine handover resource configuration information with another network AP and send the determined handover resource configuration information to the mobile station 300. A subsequent process is similar to a process executed by the first network AP and shown in FIG. 2, and will not be elaborated herein.

The mobile station in the embodiment of the disclosure may be terminal equipment in V2X, then the characteristic of predictable directionality of movement of the V2X mobile station may be utilized, a concept of handover resource is introduced, the handover resource is coordinated between the network APs in advance, and when the V2X mobile station requires handover, the handover resource may be used for handover. In such a manner, a target cell (i.e., the second network AP) may be configured before handover of the V2X mobile station, thereby reducing a handover interruption time.

Figure 5:
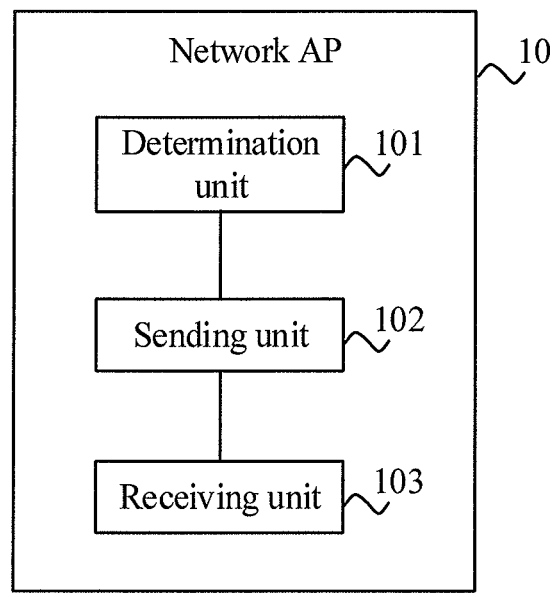
FIG. 5 is a schematic block diagram illustrating an example of a network AP according to an embodiment of the disclosure.

FIG. 5 is a schematic block diagram illustrating an example of a network AP according to an embodiment of the disclosure. The network AP 10 shown in FIG. 5 is a first network AP, and includes a determination unit 101, a sending unit 102 and a receiving unit 103.

The determination unit 101 is configured to determine handover resource configuration information with a second network AP. The sending unit 102 is configured to send the handover resource configuration information determined by the determination unit 101 to a mobile station. The receiving unit 102 is configured to receive handover indication information from the mobile station, the handover indication information indicating that the mobile station will be handed over.

Optionally, the sending unit 102 is further configured to send first indication information to the mobile station, the first indication information indicating the mobile station to communicate with the first network AP and/or the second network AP by using a configuration indicated by the handover resource configuration information.

Optionally, the receiving unit 103 is further configured to receive identification information of the second network AP from the mobile station; and the determination unit 101 is further configured to determine that the mobile station will be handed over to the second network AP according to the handover indication information and the identification information.

Optionally, the sending unit 102 is specifically configured to, when the determination unit 101 determines that the mobile station will be handed over from the first network AP to the second network AP, send the first indication information to the mobile station.

Optionally, the determination unit 101 is further configured to determine that the mobile station will be handed over from the first network AP to the second network AP according to a moving trajectory of the mobile station, determine that the mobile station will be handed over from the first network AP to the second network AP according to strength of a measurement signal reported by the mobile station, and determine that the mobile station will be handed over from the first network AP to the second network AP according to the moving trajectory and moving speed of the mobile station.

Optionally, the first indication information is indicated by one or more reserved information bits of physical-layer control signaling; or the first indication information is indicated by a new allocated RNTI; or the first indication information is indicated by a new physical-layer control signaling format.

Optionally, the handover indication information is indicated by one or more reserved information bits of the physical-layer control signaling; or the handover indication information is indicated by MAC-layer signaling; or the handover indication information is indicated by RRC signaling.

Optionally, the determination unit 101 is specifically configured to perform coordination with the second network AP through a communication interface between the first network AP and the second network AP to determine the handover resource configuration information.

Optionally, the handover resource configuration information includes at least one of: location information of a physical time-frequency resource block, modulation and coding scheme information, configuration information of a reference signal or antenna configuration information.

Optionally, the sending unit 102 is specifically configured to: when the mobile station accesses to the first network AP, send the handover resource configuration information to the mobile station; or after the mobile station accesses to the first network AP, send the handover resource configuration information to the mobile station; or when it is determined that the mobile station will be handed over from the first network AP to the second network AP, send the handover resource configuration information to the mobile station.

Optionally, the sending unit 102 is specifically configured to send the handover resource configuration information to the mobile station through a system information broadcast, or send the handover resource configuration information to the mobile station through control signaling.

Optionally, the receiving unit 103 is further configured to receive uplink data sent by the mobile station via the handover resource.

Optionally, the receiving unit 103 is specifically configured to perform coordination with at least one other network AP to receive the uplink data sent by the mobile station via the handover resource.

Optionally, the receiving unit 103 is specifically configured to use, by the first network AP physical resource configuration information, which is completely the same as or completely different from physical resource configuration information of the at least one other network AP, to receive the uplink data sent by the mobile station via the handover resource.

Optionally, the at least one other network AP includes the second network AP.

Optionally, the receiving unit 103 is specifically configured to receive a plurality of uplink data packets which are the same from the mobile station, determine one of the plurality of uplink data packets as an uplink received data packet and acquire uplink data in the uplink received data packet.

Optionally, the sending unit 102 is further configured to send downlink data to the mobile station.

Optionally, the sending unit 102 is specifically configured to perform coordination with at least one other network AP to send the downlink data to the mobile station.

Optionally, the sending unit 102 is specifically configured to use, by the first network AP physical resource configuration information, which is completely the same as or completely different from physical resource configuration information of the at least one other network AP, to send the downlink data to the mobile station.

Optionally, the at least one other network AP includes the second network AP.

Optionally, the sending unit 102 is specifically configured to send a plurality of downlink data packets which are the same to the mobile station to enable the mobile station to determine one of the plurality of downlink data packets as a downlink received data packet and acquire downlink data in the downlink received data packet.

Optionally, the first network AP is synchronized with the second network AP, or there is a first fixed timing offset value between the first network AP and the second network AP.

Optionally, the first network AP is synchronized with the mobile station, or there is a second fixed timing offset value between the first network AP and the mobile station.

Optionally, the sending unit 102 is further configured to send second indication information to the mobile station, wherein the second indication information includes at least one of: synchronization information between the first network AP and the second network AP, speed information of the mobile station or moving trajectory information of the mobile station.

Here, the handover resource configuration information includes at least one of: the location information of the physical time-frequency resource block, the modulation and coding scheme information, the configuration information of the reference signal and the antenna configuration information.

Here, the first network AP is synchronized with the second network AP, or there is the first fixed timing offset value between the first network AP and the second network AP.

Here, the first network AP is synchronized with the mobile station, or there is the second fixed timing offset value between the first network AP and the mobile station.

Figure 6:
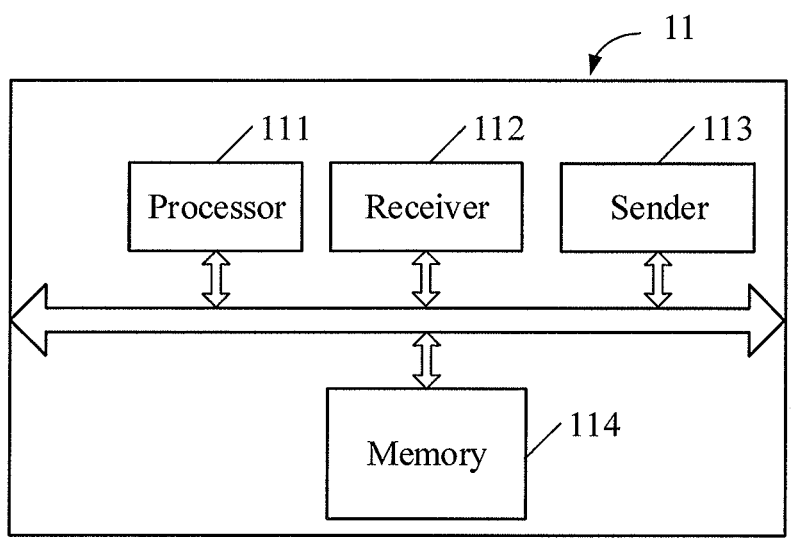
FIG. 6 is a schematic block diagram illustrating another example of a network AP according to another embodiment of the disclosure.

It is to be noted that, in the embodiment of the disclosure, the determination unit 101 may be implemented by a processor, the sending unit 102 may be implemented by a sender and the receiving unit 103 may be implemented by a receiver. FIG. 6 is a schematic block diagram illustrating another example of a network AP according to an embodiment of the disclosure. As shown in FIG. 6, a network AP 11 may include a processor 111, a receiver 112, a sender 113 and a memory 114, wherein the memory 114 may be configured to store signaling, information and the like, and may also be configured to store a code executed by the processor 111 and the like.

Each component in the network AP 11 forms communication connections, and for example, the processor 111, the memory 114 and an interface mutually communicate and transmit control and/or data signals through internal connection paths.

The network AP 10 shown in FIG. 5 or the network AP 11 shown in FIG. 6 may implement each process implemented by the first network AP in the method embodiments of FIG. 2 to FIG. 4, which will not be elaborated herein to avoid repetition.

Figure 7:
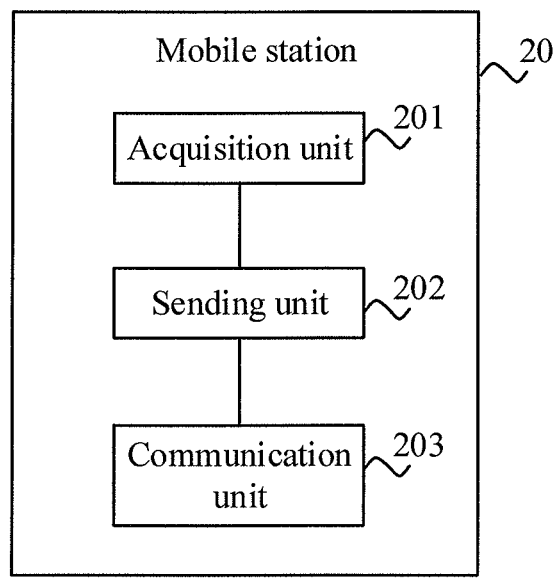
FIG. 7 is a schematic block diagram illustrating an example of a mobile station according to an embodiment of the disclosure.

FIG. 7 is a schematic block diagram illustrating a mobile station according to an embodiment of the disclosure. The mobile station 20 shown in FIG. 7 includes an acquisition unit 201, a receiving unit 202 and a communication unit 203.

The acquisition unit 201 is configured to acquire handover resource configuration information sent by a first network AP.

A sending unit is configured to send handover indication information to the first network AP, the handover indication information indicating that the mobile station will be handed over.

The communication unit 203 is configured to communicate with the first network AP and/or a second network AP by using a configuration indicated by the handover resource configuration information.

Optionally, the mobile station further includes the receiving unit 202, configured to receive first indication information sent by the first network AP, the first indication information indicating the mobile station to use a handover resource indicated by the handover resource configuration information acquired by the acquisition unit 201; and the communication unit 203 is specifically configured to communicate with the first network AP and/or the second network AP by using the configuration indicated by the handover resource configuration information according to the first indication information.

Optionally, the sending unit is further configured to send identification information of the second network AP to the first network AP such that the first network AP determines that the mobile station will be hand over to the second network AP according to the identification information and the handover indication information.

Optionally, the sending unit is specifically configured to, if the mobile station determines that the mobile station will be handed over, send the handover indication information to the mobile station.

Optionally, the mobile station further includes a determination unit configured to: determine whether the mobile station will be handed over according to a moving trajectory of the mobile station; or determine whether the mobile station will be handed over according to strength of a signal received from the first network AP; or determine whether the mobile station will be handed over according to the moving trajectory and moving speed of the mobile station.

Optionally, the first indication information is indicated by one or more reserved information bits of physical-layer control signaling; or the first indication information is indicated by a new allocated RNTI; or the first indication information is indicated by a new physical-layer control signaling format.

Optionally, the handover indication information is indicated by one or more reserved information bits of the physical-layer control signaling; or the handover indication information is indicated by MAC-layer signaling; or the handover indication information is indicated by RRC signaling.

Optionally, the acquisition unit 201 includes a first receiving subunit configured to: when the mobile station accesses to the first network AP, receive the handover resource configuration information sent by the first network AP; or after the mobile station accesses to the first network AP, receive the handover resource configuration information sent by the first network AP; or when the mobile station will be handed over from the first network AP to the second network AP, receive the handover resource configuration information sent by the first network AP.

Optionally, the handover resource configuration information is sent by the first network AP through a system information broadcast; or the handover resource configuration information is sent by the first network AP through control signaling. Optionally, the communication unit 203 includes a sending subunit configured to send uplink data via the handover resource to enable the first network AP and/or the second network AP to receive the uplink data.

Optionally, the sending subunit is specifically configured to adopt a preset CP value to send the uplink data via the handover resource to enable the uplink data to reach the first network AP and the second network AP at the same time, wherein the preset CP value is larger than a fixed threshold value.

Optionally, the communication unit 203 includes a second receiving subunit configured to receive downlink data sent by the first network AP and/or the second network AP via the handover resource.

Optionally, the communication unit 203 further includes a determination subunit and an acquisition subunit. The second receiving subunit is specifically configured to receive a plurality of downlink data packets which are the same from the first network AP and/or the second network AP. The determination subunit is configured to determine one of the plurality of downlink data packets which are the same and received by the second receiving subunit, as a downlink received data packet. The acquisition subunit is configured to acquire downlink data in the downlink received data packet determined by the determination subunit.

Optionally, the mobile station is synchronized with the first network AP, or there is a second fixed timing offset value between the mobile station and the first network AP.

Optionally, the handover resource configuration information includes at least one of: location information of a physical time-frequency resource block, modulation and coding scheme information, configuration information of a reference signal or antenna configuration information.

Optionally, the receiving unit 202 is further configured to receive second indication information sent by the first network AP, the second indication information including at least one of: synchronization information between the first network AP and the second network AP, speed information of the mobile station or moving trajectory information of the mobile station; and acquire uplink synchronization information of the second network AP according to the second indication information.

Figure 8:
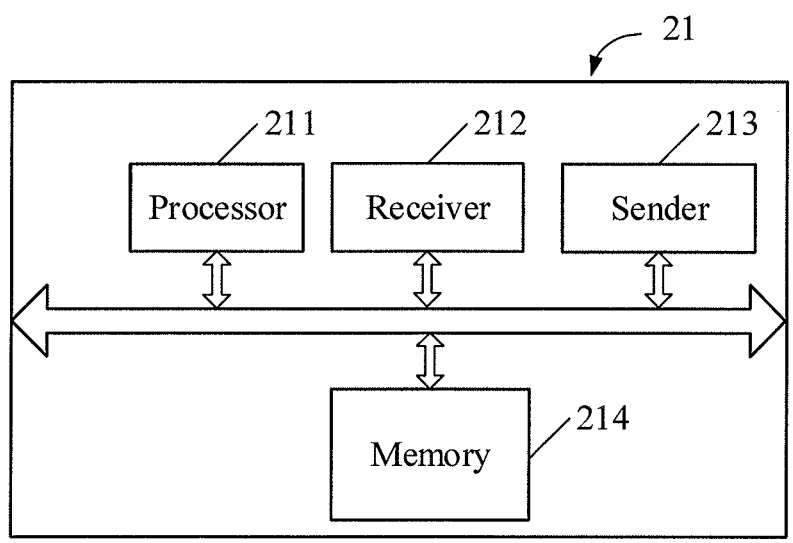
FIG. 8 is a schematic block diagram illustrating another example of a mobile station according to another embodiment of the disclosure.

It is to be noted that, in the embodiment of the disclosure, the acquisition unit 201, the receiving unit 202, the acquisition subunit, the first receiving subunit and the second receiving subunit may be implemented by a receiver, the communication unit 203 and the determination subunit may be implemented by a processor and the sending subunit may be implemented by a sender. FIG. 8 is a schematic block diagram illustrating another example of a mobile station according to an embodiment of the disclosure. As shown in FIG. 8, a mobile station 21 may include a processor 211, a receiver 212, a sender 213 and a memory 214, wherein the memory 214 may be configured to store signaling, information and the like, and may also be configured to store a code executed by the processor 211 and the like.

Each component in the mobile station 21 forms communication connections, and for example, the processor 211, the memory 214 and an interface mutually communicate and transmit control and/or data signals through internal connection paths.

The mobile station 20 shown in FIG. 7 or the mobile station 21 shown in FIG. 8 may implement each process implemented by the mobile station in the method embodiments of FIG. 2 to FIG. 4, which will not be elaborated herein to avoid repetition.

It can be understood that the processor may be an integrated circuit chip with a signal processing capability. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the methods in combination with hardware.

It can be understood that the memory in the embodiment of the disclosure may be a volatile memory or a nonvolatile memory, or may include both the volatile and nonvolatile memories, wherein the nonvolatile memory may be a ROM, a PROM, an EPROM, an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

Those of ordinary skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by virtue of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments of the disclosure according to a practical requirement.

In addition, each function unit in various embodiments of the disclosure may be integrated into a processing unit, each unit may also exist independently, and two or more than two unit may also be integrated into a unit.

When being implemented in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a piece of computer equipment (which may be a personal computer, a server, network equipment or the like) to execute all or part of the steps of the method in each embodiment of the disclosure. The abovementioned storage medium includes various media capable of storing program codes such as a U disk, a mobile hard disk, a ROM, a RAM, a magnetic disk or an optical disk.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A resource configuration method for handover, comprising:
   determining, by a first network node, handover resource configuration information with a second network node, wherein the handover resource configuration information comprises configuration information of a handover resource used by a mobile station for handover;
   sending, by the first network node, the handover resource configuration information to the mobile station; and
   receiving, by the first network node, handover indication information from the mobile station, the handover indication information indicating that the mobile station will be handed over;
   wherein after receiving, by the first network node, the handover indication information from the mobile station, the method further comprises:
   sending, by the first network node, first indication information to the mobile station, the first indication information indicating the mobile station to communicate with the first network node and/or the second network node by using a configuration indicated by the handover resource configuration information received before receiving the first indication information,
   and wherein sending, by the first network node, the first indication information to the mobile station comprises: when it is determined that the mobile station will be handed over from the first network node to the second network node, sending the first indication information to the mobile station.

2. The method as claimed in claim 1, further comprising:
   receiving, by the first network node, identification information of the second network node sent by the mobile station; and
   determining, by the first network node, that the mobile station will be handed over to the second network node according to the handover indication information and the identification information.

3. The method as claimed in claim 1, wherein before sending the first indication information to the mobile station, the method further comprises:
   determining that the mobile station will be handed over from the first network node to the second network node according to a moving trajectory of the mobile station;
   determining that the mobile station will be handed over from the first network node to the second network node according to strength of a measurement signal reported by the mobile station; and
   determining that the mobile station will be handed over from the first network node to the second network node according to the moving trajectory and moving speed of the mobile station.

4. The method as claimed in claim 1, wherein the handover indication information is indicated by one or more reserved information bits of physical-layer control signaling; or
   the handover indication information is indicated by Media Access Control (MAC)-layer signaling; or
   the handover indication information is indicated by Radio Resource Control (RRC) signaling.

5. The method as claimed in claim 1, wherein determining, by the first network node, the handover resource configuration information with the second network node comprises:

performing, by the first network node, coordination with the second network node through a communication interface between the first network node and the second network node to determine the handover resource configuration information.

6. The method as claimed in claim 1, wherein the handover resource configuration information comprises at least one of:
location information of a physical time-frequency resource block, modulation and coding scheme information, configuration information of a reference signal or antenna configuration information.

7. The method as claimed in claim 1, wherein sending, by the first network node, the handover resource configuration information to the mobile station comprises:
when the mobile station accesses to the first network node, sending the handover resource configuration information to the mobile station; or
after the mobile station accesses to the first network node, sending the handover resource configuration information to the mobile station; or
when it is determined that the mobile station will be handed over from the first network node to the second network node, sending the handover resource configuration information to the mobile station.

8. The method as claimed in claim 1, wherein sending the handover resource configuration information to the mobile station comprises:
sending the handover resource configuration information to the mobile station through a system information broadcast; or
sending the handover resource configuration information to the mobile station through control signaling.

9. The method as claimed in claim 1, further comprising:
receiving uplink data sent by the mobile station via the handover resource.

10. The method as claimed in claim 9, wherein receiving the uplink data sent by the mobile station via the handover resource comprises:
performing, by the first network node, coordination with at least one other network node to receive the uplink data sent by the mobile station via the handover resource.

11. The method as claimed in claim 10, wherein the first network node and the at least one other network node use completely the same or completely different physical resource configuration information to receive the uplink data, which is sent by the mobile station via the handover resource.

12. The method as claimed in claim 9, wherein receiving the uplink data, which is sent by the mobile station via the handover resource comprises:
receiving a plurality of uplink data packets which are the same from the mobile station, determining one of the plurality of uplink data packets as an uplink received data packet, and acquiring uplink data in the uplink received data packet.

13. The method as claimed in claim 1, further comprising:
sending, by the first network node, downlink data to the mobile station.

14. The method as claimed in claim 13, wherein sending the downlink data to the mobile station comprises:
performing, by the first network node, coordination with at least one other network node to send the downlink data to the mobile station.

15. The method as claimed in claim 1, wherein the first network node is synchronized with the second network node, or there is a first fixed timing offset value between the first network node and the second network node.

16. A resource configuration method for handover, comprising:
acquiring, by a mobile station, handover resource configuration information sent by a first network node, wherein the handover resource configuration information comprises configuration information of a handover resource used by the mobile station for handover;
sending, by the mobile station, handover indication information to the first network node, the handover indication information indicating that the mobile station will be handed over; and
communicating, by the mobile station, with the first network node and/or a second network node by using a configuration indicated by the handover resource configuration information; wherein the method further comprises;
receiving, by the mobile station, first indication information, which is sent by the first network node according to the handover indication information, the first indication information indicating the mobile station to communicate with the first network node and/or the second network node by using the configuration indicated by the handover resource configuration information received before receiving the first indication information, wherein
communicating, by the mobile station, with the first network node and/or the second network node by using the configuration indicated by the handover resource configuration information received before receiving the first indication information comprises:
communicating, by the mobile station, with the first network node and/or the second network node by using the configuration indicated by the handover resource configuration information according to the first indication information.

17. The method as claimed in claim 16, further comprising:
sending, by the mobile station, identification information of the second network node to the first network node such that the first network node determines that the mobile station will be handed over to the second network node according to the identification information and the handover indication information.

18. A network node, the network node being a first network node and comprising:
a sender;
a receiver;
a processor; and
a memory for storing instructions executable by the processor,
wherein the processor is configured to execute the instructions to:
determine handover resource configuration information with a second network node, wherein the handover resource configuration information comprises configuration information of a handover resource used by a mobile station for handover;
control the sender to send the handover resource configuration information determined by the processor to the mobile station; and
control the receiver to receive handover indication information from the mobile station, the handover indication information indicating that the mobile station will be handed over;

wherein the processor is further configured to execute the instructions to:

control the sender to send first indication information to the mobile station, the first indication information indicating the mobile station to communicate with the first network node and/or the second network node by using a configuration indicated by the handover resource configuration information received before receiving the first indication information, when it is determined that the mobile station will be handed over from the first network node to the second network node, control the sender to send the first indication information to the mobile station.

19. The method as claimed in claim 16, wherein:

acquiring, by the mobile station, the handover resource configuration information sent by the first network node comprises:

acquiring, by the mobile station, a plurality of groups of handover resource configuration information and identification information of the corresponding network nodes sent by the first network node, wherein the plurality of groups of handover resource configuration information correspond to a plurality of network nodes one to one and the plurality of network nodes comprise the second network node.

20. The method as claimed in claim 19, wherein:

the first indication information comprises identification information of the second network node;

after receiving, by the mobile station, the first indication information, which is sent by the first network node according to the handover indication information, the method further comprises:

determining, by the mobile station, the handover resource configuration information corresponding to the identification information of the second network node from the plurality of groups of handover resource configuration information received before receiving the first indication information, and communicating, by the mobile station, with the second network node by using the configuration indicated by the determined handover resource configuration information.

\* \* \* \* \*